Oct. 7, 1958

G. R. SUTHERLAND 2,854,811

SIDE DELIVERY RAKE DRIVE

Filed Dec. 3, 1956

INVENTOR.
G. R. SUTHERLAND

United States Patent Office 2,854,811
Patented Oct. 7, 1958

2,854,811

SIDE DELIVERY RAKE DRIVE

Gail R. Sutherland, Ottumwa, Iowa, assignor, by mesne assignments, to Deere & Company, a corporation of Delaware Application December 3, 1956, Serial No. 625,922

3 Claims. (Cl. 56—377)

This invention relates to a side delivery rake and more particularly to improved driving mechanism therefor.

The invention is designed primarily as an improvement on the drive mechanism shown, for example, in the U. S. patent to McClellan 2,746,233, wherein there is disclosed a typical side delivery rake having a fore-and-aft main frame including a depending leg ahead of which a reel is supported, the reel including a rearwardly positioned input shaft that is driven by gear-drive mechanism from a portion of the rear axle that supports the rake main frame. It is a feature of the present invention to improve the driving mechanism by providing a simpler and much less expensive drive avoiding the use of complicated bevel gearing. The invention has for another object the arrangement of drive means located wholly laterally outside the proximate main frame member, whereby assembly, disassembly and maintenance of the drive means is facilitated. A still further object of the invention is to provide a drive mechanism in which a stub shaft is utilized for supporting the driven member that drives the reel, this arrangement enabling the use of a single bearing. The invention features also a driving arrangement in which the position of the stub shaft may be altered without interfering with the diameter of the proximate wheel. Because of the mounting of the stub shaft on the main frame, additional brackets therefor are not required.

The foregoing and other important objects and desirable features inherent in and encompassed by the invention will become apparent as a preferred embodiment thereof is disclosed in detail in the ensuing specification and accompanying sheet of drawings, the several figures of which are described immediately below.

Figure 1:
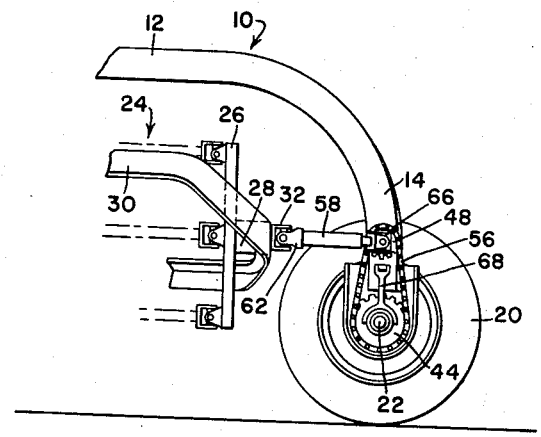
Fig. 1 is a fragmentary side elevational view of the rear portion of a typical side delivery rake.

The basic structure of the side delivery rake chosen for purposes of illustration follows fairly well that of the disclosure in the above-identified McClellan patent and accordingly the fundamental parts will be referred to only briefly. As illustrated, the main frame, shown at 10, has a forward substantially elevated portion 12 and a rearwardly depending leg 14, it being understood that the main frame 10 extends generally fore-and-aft, as will be evident from Fig. 2. The lower end of the leg 14 has a bearing 16 therein which journals a transverse axle 18. A pneumatically tired wheel 20 is carried on the axle 18 laterally inwardly of the frame leg 14, and a coaxial extension 22 of the axle 18 affords an outer axle end portion that projects laterally outwardly beyond the leg 14. The driving connection between the wheel 20 and the axle end portion 22 may involve a conventional overrunning clutch (not shown) but, since these details are not important, they are not shown and it may be assumed, for present purposes, that the axle is simply driven by the wheel 20. It will be understood, of course, that an additional wheel (not shown) spaced laterally to the right of that shown in Fig. 2, affords additional support for the main frame 10.

Figure 2:
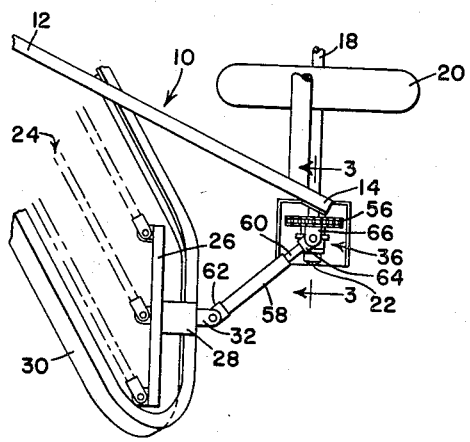
Fig. 2 is a plan view of the same.

The elevated portion 12 of the frame supports a raking reel 24, only the proximate portion of which is shown as including a rotatable element or spider 26 journaled at 28 in a rake reel frame 30, as is generally conventional. The spider or rotatable element 26 has a coaxial rearwardly extending shaft 32 and the axis of rotation of the shaft and element is at a level above that of the axle outer end portion 22 and is also laterally outwardly beyond the axle outer end portion (Fig. 2). Since the shaft 32 is forwardly of the axle outer end portion, the shaft 32 is offset above, laterally outwardly and forwardly of the axle outer end portion, which characteristic has heretofore complicated the drive means between the axle and the reel.

Figure 3:
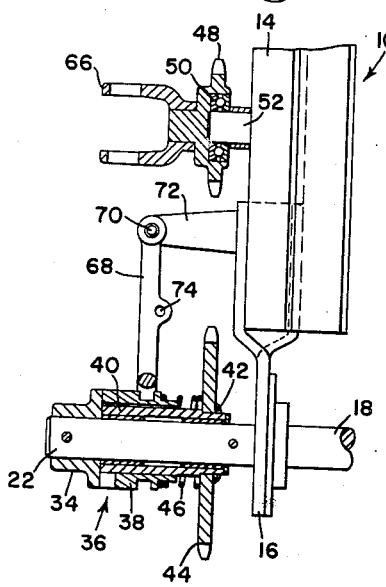
Fig. 3 is an enlarged fragmentary section as seen generally along the line 3—3 of Fig. 2, with certain portions omitted in the interests of clarity.

According to the present invention, the drive problem is solved by the provision of improved driving mechanism. As best shown in Fig. 3, the outer end portion 22 of the axle 18 has keyed thereto one part 34 of clutch means designated in its entirety by the numeral 36 and including a second clutch part 38 which is splined to for axial shifting relative to a sleeve 40 to which is welded or otherwise secured, as at 42, a driving member or sprocket 44. The clutch 36 is spring loaded at 46 for engagement and, when engaged, the sprocket 44 rotates with the axle 22.

Located directly above the sprocket 44 and coplanar therewith is a driven member or sprocket 48, the mounting for which may comprise a single anti-friction bearing 50 mounted on a stub shaft 52 that is rigidly secured in any suitable manner to the laterally outer face of the depending leg 14 of the frame 10. An endless drive element in the form of a chain 56 is trained about the two sprockets 44 and 48 and affords first drive means included in the driving mechanism.

The second driving means includes a universally jointed shaft 58, which is telescopic at 60 and which includes a first yoke 62 connected to the reel drive shaft 32 and a second yoke 64 connected to a companion yoke 66 that forms a coaxial part of or is connected to the driven sprocket 48. The shafting 58 extends outwardly and forwardly between the sprocket 48 and the reel shaft 32.

The clutch is controlled by actuating means including a shifter fork 68 which controls the axial position of the clutch part 38 and which is pivoted at 70 at its upper end to a bracket 72. This bracket is rigidly secured to and projects laterally outwardly from the depending frame leg 14 and is so positioned as to lie vertically intermediate the sprockets 44 and 48 and to be straddled by the front and rear runs of the drive chain 56, the construction thereby affording a convenient and compact association of parts. The overall compactness of the design may be readily appreciated from Figs. 1 and 3. The shifter fork 68 is provided with an eye 74 which may receive a cable or similar element (not shown) by means of which the clutch may be controlled from a remote position.

In addition to the features already mentioned, it should be noted that the location of the stub shaft and sprocket 48 outwardly of the frame leg 14 enables positioning thereof irrespective of the size of the tire on wheel 22. That is to say, if the shaft is carried inwardly of the frame leg as a jackshaft, for example, the axis of the shaft must be high enough to clear the tire. In order to accomplish the proper level of such axis, additional brackets must be used to support the jackshaft in either a fore or aft position, thereby adding unduly to the cost of the drive. As it is, the outer position of the means enables vertical selection of the position of the stub shaft without limitations imposed by the size of the tire. This is important from the standpoint of enabling the location of the stub shaft in such position that it is substantially horizontally level with the reel shaft 32 when the reel is in operating position. The universal joints accommodate not only the difference in angular relationship between the axes of the sprocket 48 and reel shaft 32 but, in combination with the telescopic connection at 60, accommodate changes in the vertical position of the reel frame and reel as they are adjusted. Since the floating or adjustable mounting of the reel and reel frame is conventional, it has not been shown here and is referred to only as part of the background organization of the rake.

Features of the invention not categorically enumerated herein will undoubtedly occur to those versed in the art, as will many modifications and alterations in the preferred embodiment of the invention disclosed, all of which may be achieved without departure from the spirit and scope of the invention.

What is claimed is:

1. A side-delivery rake, comprising: a generally fore-and-aft main frame having an elevated support portion and a depending rear leg; a transverse axle journaled on the leg and including an outer end portion projecting laterally outwardly beyond said leg; a rotary drive member mounted on and rotatable with said axle outer end portion; a wheel on and drivingly connected to the axle laterally inwardly of the leg; reel mechanism adjustably supported from the frame support portion for vertical movement between operating and transport positions and including a generally fore-and-aft input shaft rotatable on an axis ahead of and laterally outwardly beyond and at a level above the outer end portion of the axle; a rotary driven member journaled on and laterally outwardly of the leg on an axis substantially directly above and parallel to the axle outer end portion and generally at the level of the input shaft when the reel mechanism is in an operating position; an endless drive element interconnecting the two rotary members; and universally jointed shafting extending outwardly and forwardly from the driven member to the input shaft and drivingly interconnecting the two.

2. The invention defined in claim 1, including: a clutch for selectively connecting and disconnecting the drive member and wheel, said clutch being located on the axle outer end portion and thus laterally outwardly of the leg and including clutch-actuating means having a supporting bracket mounted on and projecting laterally outwardly from the leg vertically intermediate the two rotary members and straddled by the front and rear runs of the endless element.

3. The invention defined in claim 1, including: a stub shaft mounted on and outwardly of the leg and projecting outwardly therefrom in overhanging relation to the axle outer end portion on the axis of the driven sprocket and serving to mount said driven sprocket.

References Cited in the file of this patent

UNITED STATES PATENTS

| | | |
|---|---|---|
| 2,746,233 | McClellan et al. | May 22, 1956 |
| 2,763,120 | Johnson | Sept. 18, 1956 |